US008923760B2

(12) United States Patent
Iwasaki

(10) Patent No.: US 8,923,760 B2
(45) Date of Patent: Dec. 30, 2014

(54) ORIENTATIONAL COLLABORATION OF DATA BETWEEN MULTIPLE DEVICES

(75) Inventor: Jill S. Iwasaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 153 days.

(21) Appl. No.: 13/457,378

(22) Filed: Apr. 26, 2012

(65) Prior Publication Data

US 2013/0288603 A1    Oct. 31, 2013

(51) Int. Cl.
*H04B 5/00* (2006.01)
*H04B 7/00* (2006.01)
*G06F 3/00* (2006.01)
*H04W 4/00* (2009.01)
*H04W 4/02* (2009.01)
*H04W 4/20* (2009.01)

(52) U.S. Cl.
CPC .............. *H04W 4/008* (2013.01); *H04W 4/006* (2013.01); *H04W 4/026* (2013.01); *H04W 4/206* (2013.01)
USPC .......................... 455/41.1; 455/41.2; 715/761

(58) Field of Classification Search
CPC .................................................... G06F 3/0488
USPC ......... 455/41.1–41.3, 457; 715/761, 863, 781
See application file for complete search history.

(56) References Cited

U.S. PATENT DOCUMENTS

| | | | |
|---|---|---|---|
| 7,970,870 B2 | 6/2011 | Hinckley et al. | |
| 2008/0216125 A1 | 9/2008 | Li et al. | |
| 2009/0031258 A1* | 1/2009 | Arrasvuori et al. | 715/863 |
| 2009/0319181 A1 | 12/2009 | Khosravy et al. | |
| 2010/0121921 A1 | 5/2010 | Dunton | |
| 2011/0001686 A1 | 1/2011 | Belvin et al. | |
| 2011/0081923 A1 | 4/2011 | Forutanpour et al. | |
| 2011/0113350 A1* | 5/2011 | Carlos | 715/753 |
| 2011/0148752 A1* | 6/2011 | Alameh et al. | 345/156 |
| 2011/0154014 A1 | 6/2011 | Thorn | |
| 2011/0252320 A1* | 10/2011 | Arrasvuori et al. | 715/704 |
| 2012/0062758 A1 | 3/2012 | Devine et al. | |
| 2012/0154265 A1* | 6/2012 | Kim et al. | 345/156 |
| 2012/0206391 A1* | 8/2012 | Kim et al. | 345/173 |
| 2012/0208461 A1* | 8/2012 | Choi et al. | 455/41.2 |
| 2014/0123038 A1* | 5/2014 | Ahn et al. | 715/761 |

OTHER PUBLICATIONS

Ballendat, et al., "Proxemic Interaction: Designing for a Proximity and Orientation-Aware Environment," Department of Computer Science, University of Calgary, Canada, Its' 10, Nov. 7-10.
International Search Report and Written Opinion—PCT/US2013/038248—ISA/EPO—Jul. 26, 2013.

* cited by examiner

*Primary Examiner* — Andrew Wendell
*Assistant Examiner* — Cindy Trandai
(74) *Attorney, Agent, or Firm* — Jeffrey D. Jacobs

(57) ABSTRACT

The disclosure provides for collaborating user data maintained in separate mobile devices by tangibly manipulating the distance and orientation between the mobile devices. The placement of one device with respect to one or more other devices triggers an action when the proximity and orientation between the devices is detected. The data on each proximal device is temporarily shared among the devices, allowing the users of the devices to see the aggregated data.

24 Claims, 10 Drawing Sheets

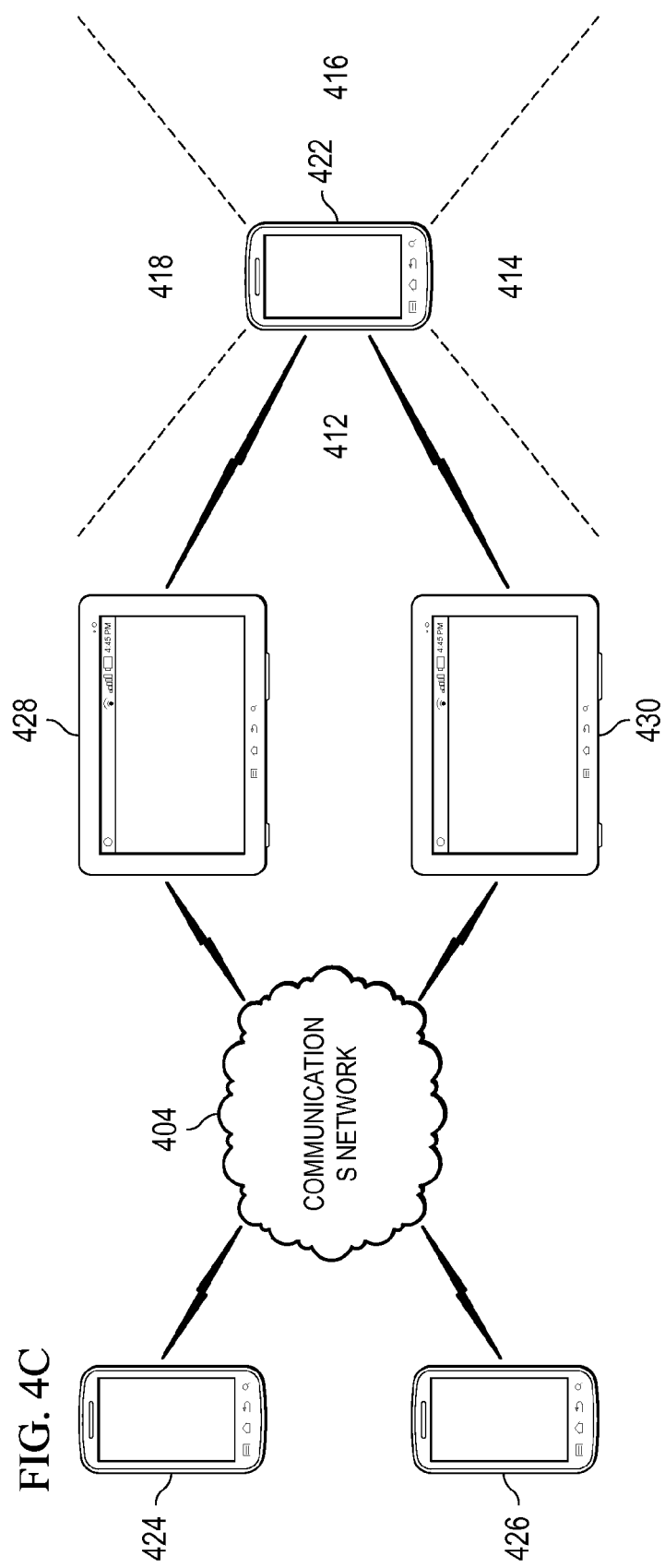

ORIENTATIONAL COLLABORATION OF DATA BETWEEN MULTIPLE DEVICES

BACKGROUND

1. Field

Aspects of the present disclosure relate generally to electronic user interfaces, and more particularly, to collaboration of data maintained in separate devices by tangibly manipulating the distance and orientation between the devices.

2. Background

Over the last number of years, the availability and market penetration of mobile electronics into society has greatly increased. Smart phones are quickly outpacing voice-only mobile phones or enhanced feature phones in sale and placement into the market. In addition to smart phones, people are obtaining tablet computers, notebook and netbook computers, and other portable computing devices to supplement communication, productivity, life organization, and maintaining connectivity to social media.

Many current mobile electronic devices provide operational platforms for supplemental applications, whether provided through independent third parties, network operators, manufacturers, or the like. Thus, in addition to maintaining a calendar, email access, internet access, and communication functionalities, many such modern electronic devices provide computer platforms for various types of applications, such as supplemental communication applications, games and entertainment, social media applications, visual media development environments, productivity applications, and the like.

One of the reasons behind the growth in such mobile electronics is the desire to remain connected to other people. Friends may interact through social media, short messaging service (SMS) or text messages, email, and the like. Families may remain connected similarly and also coordinate schedules, to do lists, shopping lists, and the like. However, while such advanced mobile electronics are becoming an increasing part of everyday life, maintaining communications with friends or family through all of the various means for maintaining communications can become an extremely time-consuming process.

SUMMARY

In one aspect of the disclosure, a method for collaborating user data. The method includes detecting, by a first mobile device, proximity and orientation information for one or more additional mobile devices, establishing, by the first mobile device, a communication link with the one or more mobile devices, when the proximity and orientation information corresponds to a first shared collaboration state, selecting an application to execute in response to the detected proximity and orientation information, receiving remote user data associated with the application from each of the one or more mobile devices over the communication link, and populating a display interface with visual data associated with the application using local user data and the received remote user data.

In an additional aspect of the disclosure, an electronic apparatus includes means for detecting, by a first mobile device, proximity and orientation information for one or more mobile devices, means for establishing, by the first mobile device, a communication link with the one or more mobile devices, when the proximity and orientation information corresponds to a first shared collaboration state, means for selecting an application to execute in response to the detected proximity and orientation information, means for receiving remote user data associated with the application from each of the one or more mobile devices over the communication link, and means for populating a display interface with visual data associated with the application using local user data and the received remote user data.

In an additional aspect of the disclosure, a computer program product has a computer-readable medium having program code recorded thereon. This program code includes code, executable at a user device, to detect, by a first mobile device, proximity and orientation information for one or more mobile devices, code to establish, by the first mobile device, a communication link with the one or more mobile devices, when the proximity and orientation information corresponds to a first shared collaboration state, code to select an application to execute in response to the detected proximity and orientation information, code to receive remote user data associated with the application from each of the one or more mobile devices over the communication link, and code to populate a display interface with visual data associated with the application using local user data and the received remote user data.

In an additional aspect of the disclosure, a user device includes at least one processor and a memory coupled to the processor. The processor is configured to detect, by a first mobile device, proximity and orientation information for one or more mobile devices, to establish, by the first mobile device, a communication link with the one or more mobile devices, when the proximity and orientation information corresponds to a first shared collaboration state, to select an application to execute in response to the detected proximity and orientation information, to receive remote user data associated with the application from each of the one or more mobile devices over the communication link, and to populate a display interface with visual data associated with the application using local user data and the received remote user data.

BRIEF DESCRIPTION OF THE DRAWINGS

FIG. 4C is a block diagram illustrating three rich devices and two collaboration devices configured according to another aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The disclosure provides for collaborating user data maintained in separate mobile devices by tangibly manipulating the distance and orientation between the mobile devices. The placement of one device with respect to one or more other devices triggers an action when the proximity and orientation between the devices is detected. This action could be opening an application on each of the proximal devices. When the application is opened, the data on each proximal device is temporarily shared among the devices, allowing the users of the devices to see the collective/collaborative data. Moving the devices in relation to each other to change the distance and orientation would then trigger a different action. This different action would again provide temporary sharing of the individual user's data on each device.

The collaboration may also use a secondary device that provides the collection and display point for all of the shared data. For example, a tablet computer may be used as the secondary device. When users with smart phones or other tablets place their devices in certain positions and distances from the secondary device, the actions are triggered and the applications and shared data are presented on the secondary device. When the users change positioning of their respective devices around the secondary device, new actions are triggered with different sets of data being temporarily shared. Although the present disclosure focuses on collaboration using one or more collaboration devices tied to rich electronic devices like cellular phones or tablets, it should be readily understood that any of the rich devices can be made capable of functioning as the collaboration device with respect to itself and any other of the rich devices (e.g., local devices and/or designated remote devices).

Figure 1:
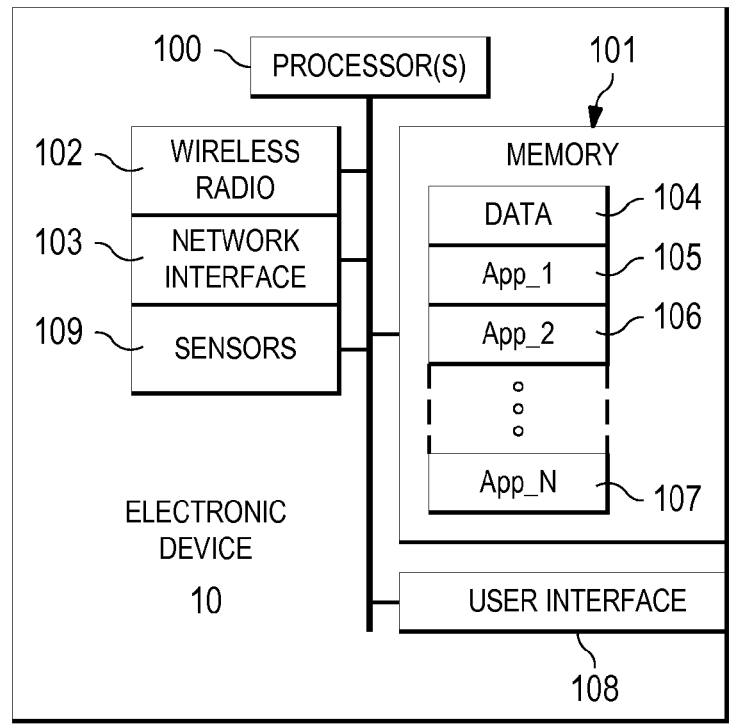
FIG. 1 is a block diagram illustrating an electronic device configured according to one aspect of the present disclosure.

FIG. 1 is a block diagram illustrating an electronic device 10 configured according to one aspect of the present disclosure. Electronic device 10 includes various components common to many typical smart phones, tablet computers, notebook and netbook computers, computers, and the like. Devices, such as electronic device 10 include the processing power, memory, and programming to perform complex tasks, run complex programs, and interact substantially with a user, and may be also referred to herein as rich user devices.

The functionality and operations of electronic device 10 are controlled and executed through processor(s) 100. Processor(s) 100 may include one or more core processors, central processing units (CPUs), graphical processing units (GPUs), math co-processors, and the like. Processor(s) 100 executes program logic, whether implemented through software stored in a memory 101 or in firmware in which logic is integrated directly into integrated circuit components. Electronic device 10 may communicate wirelessly through various radios, such as wireless radio 102, such as one or more of wireless wide area network (WWAN) radios and wireless local area network (WLAN) radios, such as WIFI™, BLUETOOTH®, WIFI™ Direct, BLUETOOTH® Low Energy (LE), ZIGBEE®, and the like. If a WWAN radio is included as one of the radios in wireless radio 102, communication would generally be allowed to communicate over a long range wireless communication network such as 3G, 4G, LTE, and the like. Various WLAN radios, such as WIFI™, BLUETOOTH®, WIFI™ Direct, BLUETOOTH® Low Energy (LE), ZIGBEE®, and the like, would allow communication over a shorter range. Electronic device 10 may also provide communication and network access through a wired connection with network interface 103. The wired connection may connect to the publicly-switch telephone network (PSTN), or other communication network, in order to connect to the Internet or other accessible communication network.

Under control of processor(s) 100, program logic stored on memory 101, including data 104, application_1 105-application_N 107, provides functionality of electronic device 10 including communications, Internet access, and execution of various programs for productivity, entertainment, collaboration, and the like. For example, applications stored in memory 101 may, when executed by processor(s) 100, operate calendar programs, game programs, list programs, social media programs, web browsers, and the like. Such operating applications are displayed visually to the user via user interface component 108. The user interface component 108 includes various hardware and software applications that control the rendering of visual information onto the display screen of the mobile device (not shown). The user interface component 108, under control of the processor(s) 100, controls and operates all forms of interfaces between the user and electronic device 10. Thus, for example, when electronic device 10 is implemented using a touch screen display, user interface component 108 reads the user's input and finger motions on the touch screen and translates those movements or gestures into electronic interface navigational commands and data entry. Various aspects of user interface component 108 also will receive the rendered visual data through processing, controlled by processor(s) 100, and display that visual information on the display. Thus, during input to a touch screen device, the user interface component 108 may be receiving and analyzing input data from a user's finger movements and gestures on the display screen. It may also be receiving data from the processor(s) 100 in the form of processed visual or sound data to be output by display to the user, some of which may be to reflect movement of screen objects in response to the user's finger movements.

Electronic device 10 also includes sensors component 109, under control of processor 100. Sensors component 109 may include multiple sensors for sensing various things. For example, one common sensor that may be included in sensors component 109 is an accelerometer. An accelerometer is able to gauge the precise movements of the electronic device 10. By measuring these precise movements, logic executing by processor 100 may determine the precise movements and orientation of mobile device 10. Additional sensors that may be included in the sensors component 109 may be a gyroscope, a proximity sensor, heat sensor, light sensor, or the like. The input to and output from these various sensors in sensors component 109 may be used for various applications stored in memory 101.

Figure 2:
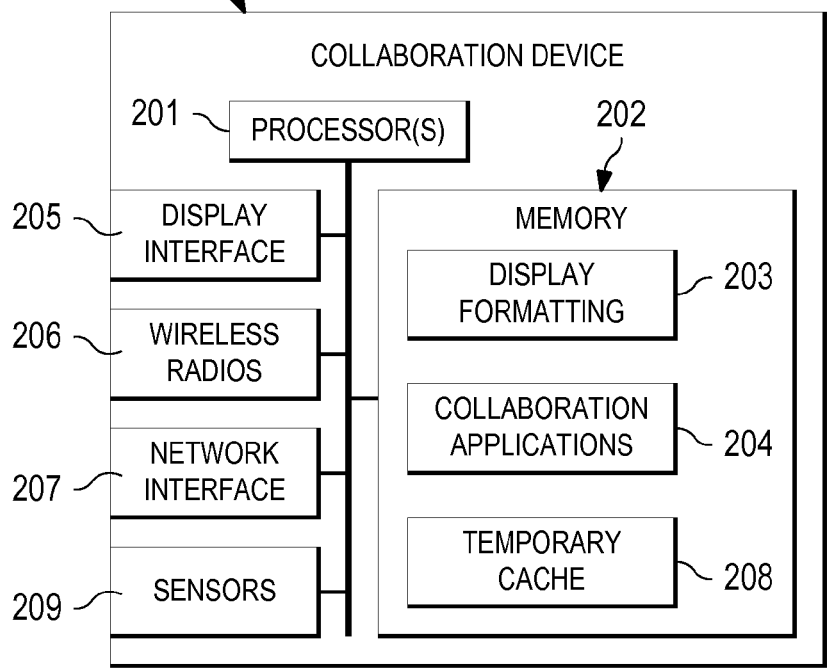
FIG. 2 is a block diagram illustrating a collaboration device configured according to one aspect of the present disclosure.

FIG. 2 is a block diagram illustrating a collaboration device 200 configured according to one aspect of the present disclosure. Collaboration device 200 includes a processor(s) 201 that controls and executes the functionalities and features provided by collaboration device 200. Collaboration device 200 may be an electronic device, such as electronic device 10 (FIG. 1) or it may be an electronic device with limited functionality. For example, collaboration device 200 may receive and display information without providing the capability for a user in possession of collaboration device 200 to do more than turn the device on and off and change the arrangement of the view of the displayed information. Collaboration device 200 may also be a secondary display device as described in co-pending, commonly-owned patent entitled, "SHARING USER INFORMATION THROUGH SECONDARY DISPLAYS," U.S. application Ser. No. 13/420,494, the disclosure of which is incorporated herein in its entirety for all purposes.

Collaboration device 200 includes memory 202, coupled to processor(s) 201. Memory 202 contains software, program code, data, and the like which the processor(s) 201 may access and execute to implement any of the functions of collaboration device 200. For example, memory 203 contains display formatting 203, two or more collaboration applications 204, and a temporary cache 208, which temporarily stores the received data and information for display on the collaboration device 200. Collaboration device 200 includes communication capabilities through wireless radios 206 and network interface 207. Wireless radios 206 include multiple radios to facility communication of the various protocols, including WWAN communication, WLAN communications, such as WIFI™, BLUETOOTH®, WIFI™ Direct, BLUETOOTH® Low Energy (LE), ZIGBEE®, and the like. Additionally, wireless radios 206 can include multiple antennas spatially arrayed to permit differential signal strength analysis to determine orientation between a proximate electronic device and the collaboration device. Alternative or additional orientation determination components can also be included as described further below.

When collaborative information is received by collaboration device 200, processor(s) 201, in operating the selected one of the collaboration applications 204, accesses the display formatting 203 for the display parameters to use in controlling display interface 205 to display the received information onto the embedded display. As the collaborative information is updated, the new information replaces the current information currently displayed by collaboration device 200.

Collaboration device 200 also includes sensors component 209, under control of processor(s) 201. Sensors component 209 may include multiple sensors for sensing various things. For example, one common sensor that may be included in sensors component 209 is an accelerometer. An accelerometer is able to gauge the precise movements of the secondary display device 200. By measuring these precise movements, logic executing by processor 201 may determine the precise movements and orientation of collaboration device 200. Additional sensors that may be included in the sensors component 209 may be a gyroscope, a proximity sensor, heat sensor, light sensor, or the like. The input to and output from these various sensors in sensors component 209 may be used for various applications stored in memory 202.

Figure 3:
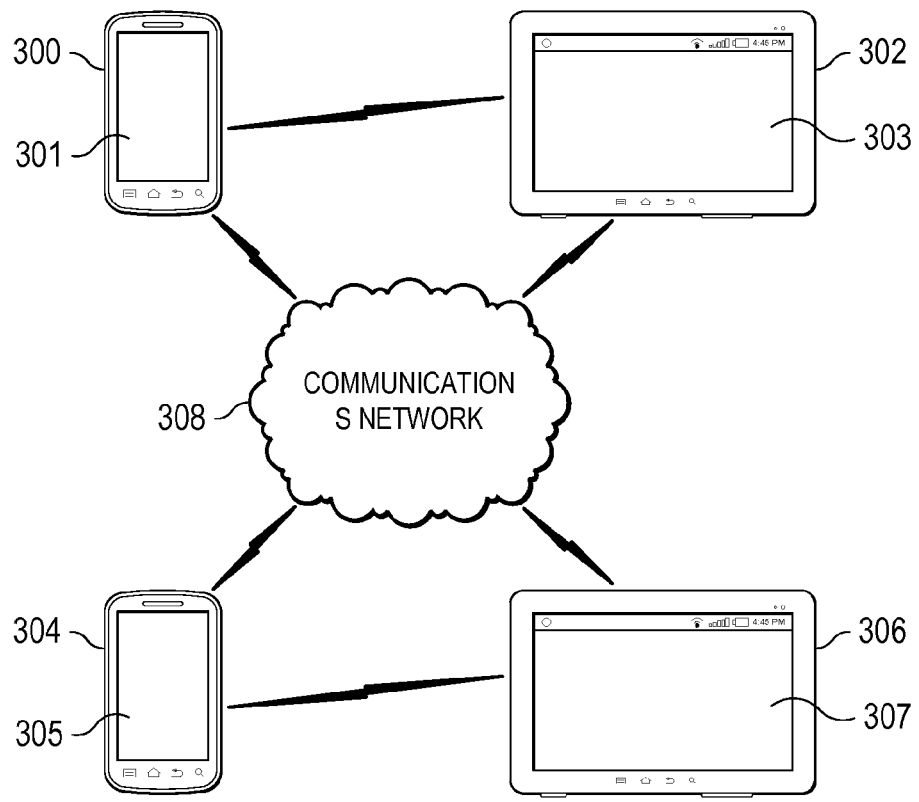
FIG. 3 is a block diagram illustrating a rich devices and collaboration devices configured according to one aspect of the present disclosure.

FIG. 3 is a block diagram illustrating pairings between rich electronic devices 300 and 304 with secondary display devices 302 and 306. The pairings are configured according to the technology disclosed in the co-pending, commonly-owned patent entitled, "SHARING USER INFORMATION THROUGH SECONDARY DISPLAYS," Ser. No. 13/420,494. Rich electronic device 300, having a display 301, pairs with secondary display device 302, having display 303. The pairing allows for sharing and display of certain types or groups of data from rich electronic device 300 to secondary display device 302. The selected data for sharing is transmitted from rich electronic device 300 to secondary display device either directly through WLAN communication, when within the range of such WLAN radios, or through communications network 308, through either WWAN or WLAN communications. The shared data, received by the paired devices, secondary display devices 302 and 306, is then displayed on displays 303 and 307, respectively.

Representative aspects of the present disclosure allow for users to temporarily collaborate data between various collaboration devices. Thus, a user in possession of both of secondary display devices 302 and 306 may temporarily collaborate the current data on such devices with another anchor device, such as a smart phone, tablet computer, laptop, or other such collaboration device.

Figure 4B:
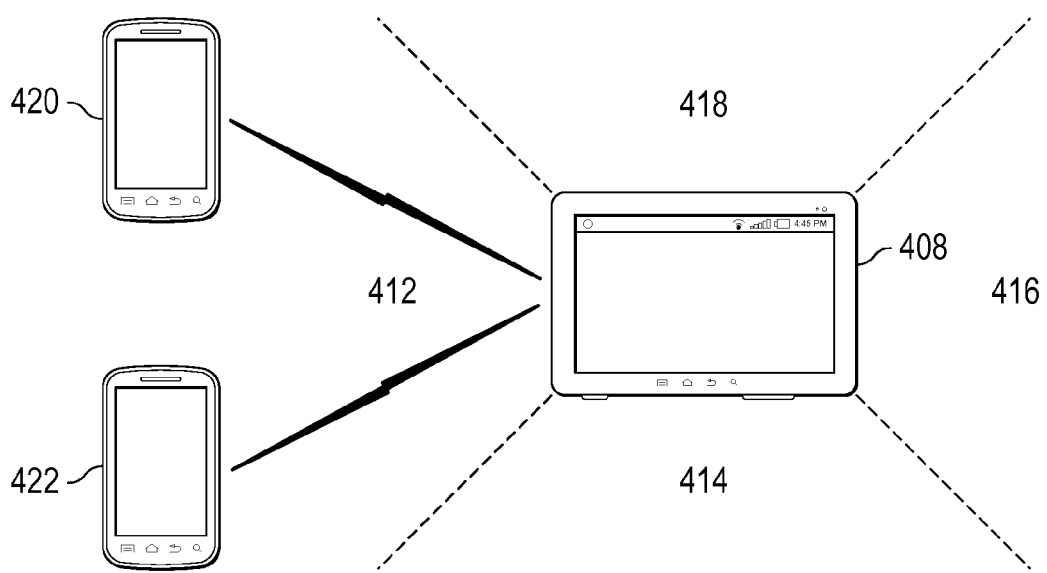
FIG. 4B is a block diagram illustrating two rich devices and two collaboration devices configured according to another aspect of the present disclosure.
Figure 4A:
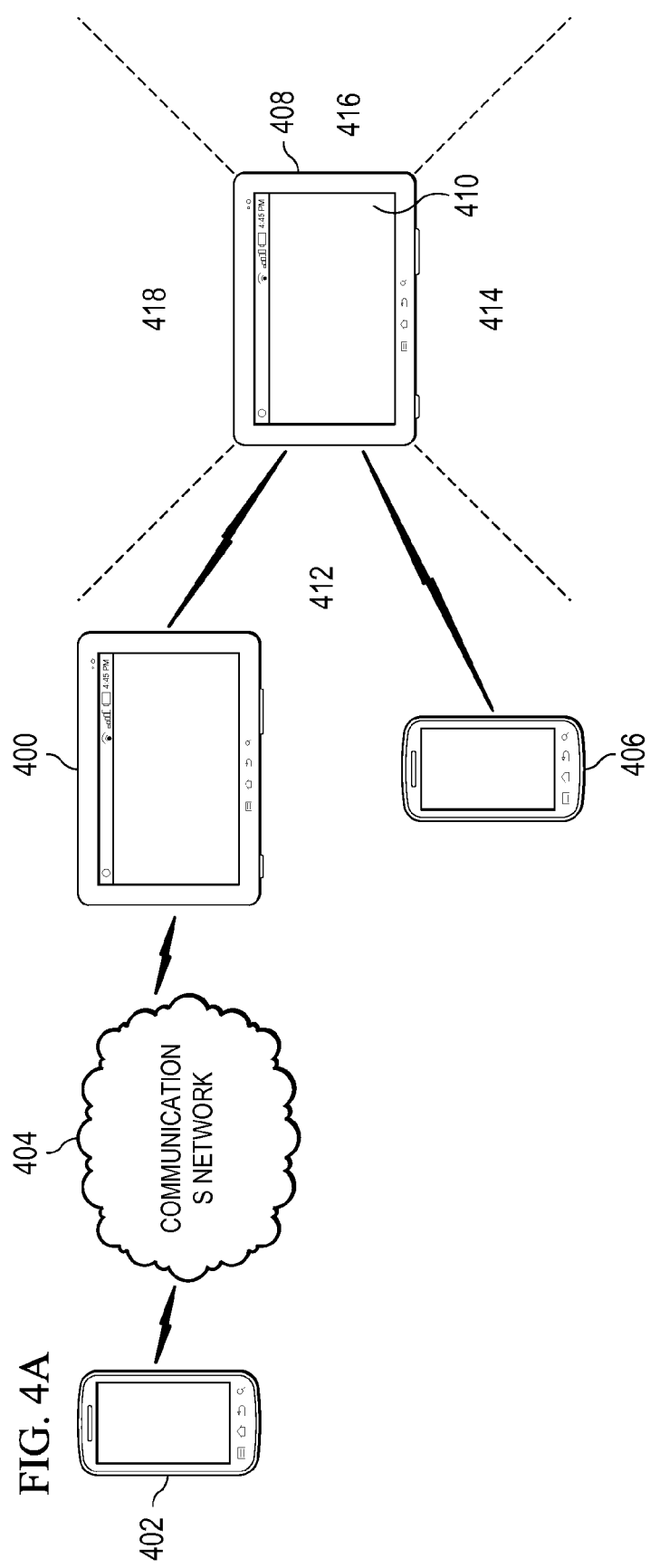
FIG. 4A is a block diagram illustrating a rich device and a collaboration device configured according to one aspect of the present disclosure.

FIG. 4A is a block diagram illustrating a collaboration environment configured according to one aspect of the present disclosure. Secondary display device 400 is paired with rich electronic device 402 to receive and display shared calendar data from rich electronic device 402. The user of rich electronic device 402 is remote from secondary display 400, which triggers communication of the shared data from rich electronic device 402 using communications network 404. A second and third user are together in single location and would like to collaborate calendar information in order to plan for an upcoming holiday. The first user uses mobile device 406 to keep up with a calendar. The second user has calendar information on tablet computer 408.

In operation, the second user activates the collaboration mode of tablet computer 408. The collaboration mode initiates program code and an operating environment in which multiple collaboration zones 412, 414, 416, and 418 control collaboration of associate types of information for common display onto display 410 of tablet computer 408. Each of secondary display device 400 and mobile device 406 have compatible collaboration features that are triggered by the establishment of the collaboration zones 412, 414, 416, and 418. In the illustrated aspect, collaboration zone 412 represents calendar collaboration. When secondary display device 400 and mobile device 406 are placed in proximity to tablet computer 408 within collaboration zone 412, the collaboration code is activated in secondary display device 400 and mobile device 406 causing the current calendar data in each device to be transmitted to tablet computer 408 using a WLAN communication method. The anchor device, tablet computer 408, also detects the proximity of secondary display device 400 and mobile device 406 within collaboration zone 412 and triggers the calendar function, expecting to receive calendar data from the external sources and combining that information with the local calendar information on tablet computer 408. Each of these devices is capable of detecting either that they are located within collaboration zone 412 or that collaborating devices are located within collaboration zone 412, which identifies to the devices which type of data to share and display.

The collaboration operating environment of tablet computer 408 displays a calendar and populates the calendar with an aggregate of calendar information from secondary display device 400 and mobile device 406, remotely, and from tablet computer 408 locally. Each of the users may then view the calendar display on tablet computer 408 and view the combined, aggregate calendar of each user. After the users complete viewing, the collaboration session may be ended or broken by removing secondary display device 400 and mobile device 406 from proximity to the collaboration zone

412. Once removed, tablet computer 408 deletes the remote data from secondary display device 400 and mobile device 406 and removes the corresponding displayed calendar entries.

It should be noted that if either one of secondary display device 400 or mobile device 406 stay proximate to the collaboration zone 412, only the data and calendar display of the removed device will be removed or deleted from the collaboration display by tablet computer 408.

It should be noted that the various aspects of the present disclosure may use multiple different methods for determining proximity and relational orientation or location between the different devices and the different collaboration zones. For example, the devices may use signal strength and direction analysis, signal round-trip time, temperature measurements, location information, or other such proximity detection processes.

FIG. 4B is a block diagram illustrating an example collaboration environment configured according to one aspect of the present disclosure. In the example aspect illustrated in FIG. 4B, three users would like to collaborate calendar data. The users operate mobile devices 420 and 422 and tablet computer 408. Each of these devices is a rich electronic device having more capability than a secondary display device. The user of tablet computer 408 activates the collaboration application which establishes the collaboration environment and collaboration zones 412, 414, 416, and 418. As the users bring mobile devices 420 and 422 into proximity to tablet computer 408 in collaboration zone 412, collaboration applications are triggered, causing the devices to select the appropriate type of data, here calendar data corresponding to location within collaboration zone 412, and to transmit this device to the anchor device. The anchor device, tablet computer 408, also correspondingly determines the proximity of the mobile devices 420 and 422 within collaboration zone 412 and executes the calendar operation of the collaboration application.

The anchor device, tablet computer 408 displays a calendar image and populates the calendar image with aggregated calendar data from mobile devices 420 and 422, and retrieved locally from tablet computer 408. As described above, as any one or both of mobile devices 420 or 422 are removed from proximity to tablet computer 408 within collaboration zone 412, tablet computer 408 will delete their corresponding data and remove the calendar data from display.

FIG. 4C is a block diagram illustrating another collaboration environment configured according to one aspect of the present disclosure. In the illustrated example, the user with mobile device 422 desires to collaborate calendar information with two other users who have mobile devices 424 and 426. These users have given the first user secondary display devices 428 and 430, which have been paired with mobile devices 424 and 426, respectively, to share and display calendar data from the other users. As the first user desires to collaborate data, he or she activates the collaboration feature of mobile device 422, which triggers the collaboration operating environment and collaboration zones 412, 414, 416, and 418. The user then places secondary display devices 428 and 430 proximate to mobile device 422 within collaboration zone 412. Secondary display devices 428 and 430 detect placement proximate to mobile device 422 within collaboration zone 412 and selects the current calendar data to transmit to mobile device 422. Upon detection of the proximate devices within collaboration zone 412 and receipt of the data, mobile device 422 will display a calendar on display 434, populated with the aggregated data from secondary display devices 428 and 430 and with the local calendar data from mobile device 422. When the user is finished viewing the collaborated calendar, he or she may remove secondary display devices 428 and 430 causing mobile device 422 to delete the associated calendar data from the secondary display devices and removing the displayed entries from the calendar on display 434.

Figure 5:
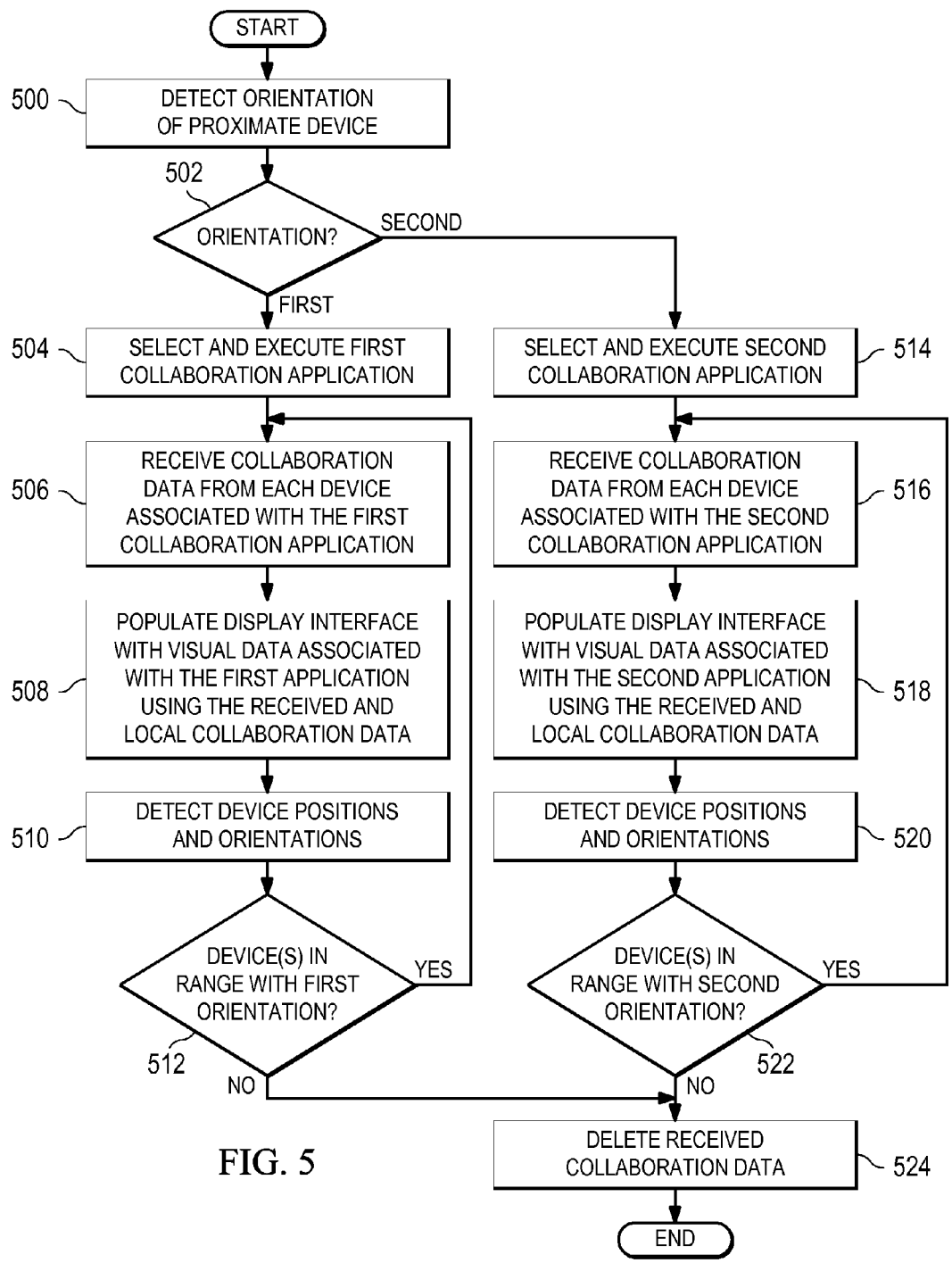
FIG. 5 is a functional block diagram illustrating example blocks executed to implement one aspect of the present disclosure.

FIG. 5 is a functional block diagram illustrating example blocks executed to implement one aspect of the present disclosure. In block 500, the orientation devices proximate to an anchor device is detected. A determination is made, in block 502, of the orientation of the device. When the device is determined to be in a first orientation with respect to the anchor device, in block 504, a corresponding first collaboration application is selected and executed. The first collaboration application may be an application that aggregates and collaborates calendar data, location data, photographic data, and the like. The anchor device receives collaboration data, in block 506, associated with the first collaboration application and populates a display interface, in block 508, with visual data representing the collaboration data received and similar local collaboration data.

In block 510, the anchor device continues to detect for positions and orientations of the proximate devices. A determination is made, in block 512, whether the proximate devices are still within the range or configuration of the first orientation. If so, then the anchor devices continues to monitor for data from the proximate devices in block 506. If the proximate device is no longer within range, or no longer proximate, then the received collaboration data is deleted from the anchor device at block 524.

If the device is determined to be in a second orientation in response to the determination of block 502, the anchor device selects and executes an associated second collaboration application in block 514. The process for the detected second orientation corresponds to the process as described with respect to the first orientation. The anchor device receives the collaboration data, in block 516, and populates the display interface with both the received and local collaboration data, in block 518. The position and orientation of the proximate devices is continually monitored in block 520. A determination is made, in block 522, whether the proximate device is still within the range and configuration of the second orientation. If so, then the process continues again, from block 515. Otherwise, if the proximate device is no longer proximate, then, in block 524, the received collaboration data is deleted from the anchor device.

Figure 6:
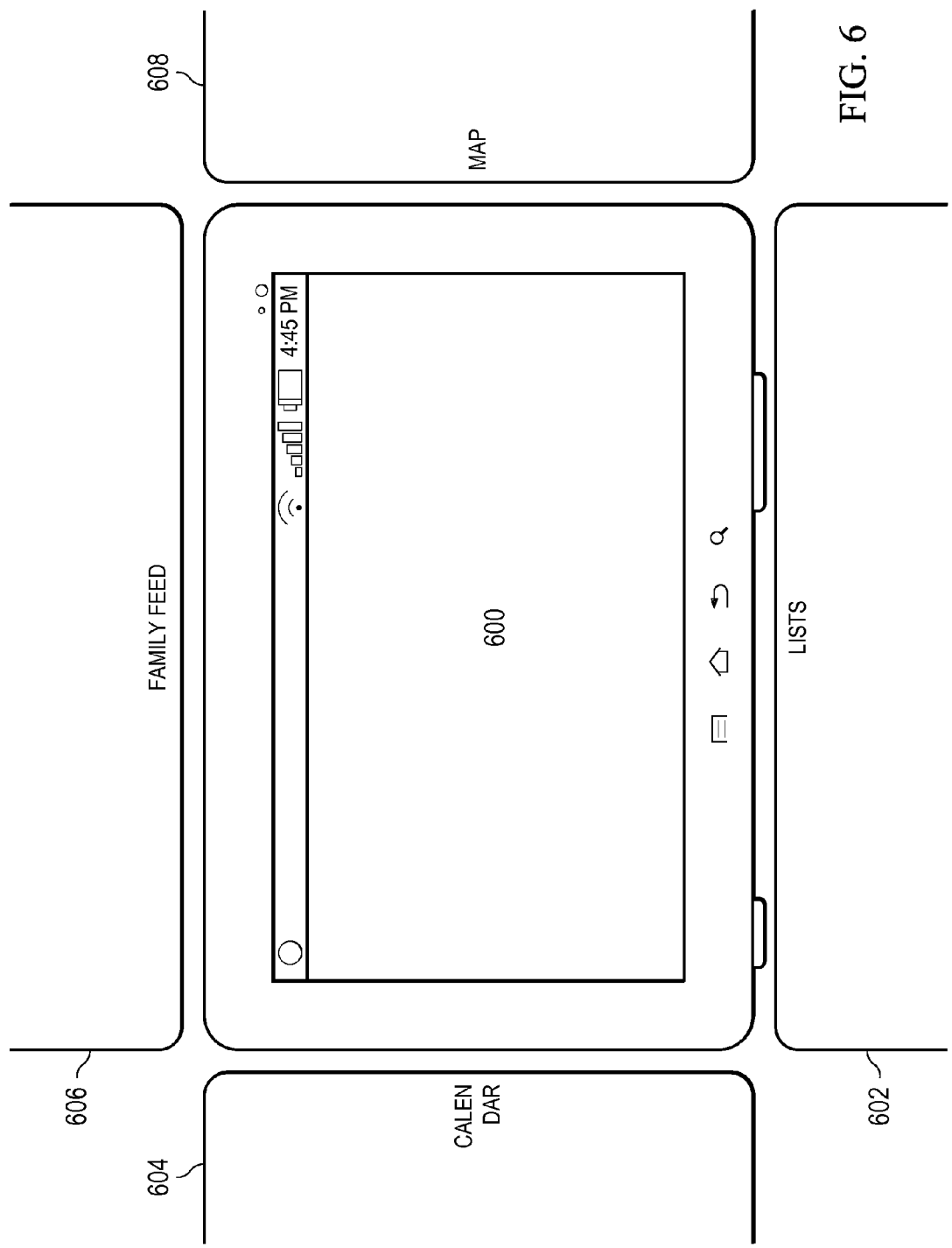
FIG. 6 is a graphical illustration of a collaboration device configured to trigger display of collaborated user data according to one aspect of the present disclosure.

Turning now to FIGS. 6-10 and referring particularly to FIG. 6, an exemplary collaboration via a collaboration device 600 can utilize four predefined collaboration zones 602, 604, 606, and 608, respectively, arranged at the lower edge, left side edge, top edge, and right side edge of the device 600. The collaboration zones can be preconfigured or user designated for launching various collaboration applications, such as a collaborative list application, a collaborative calendar application, a collaborative social media application, and a collaborative map/navigation application.

Figure 7:
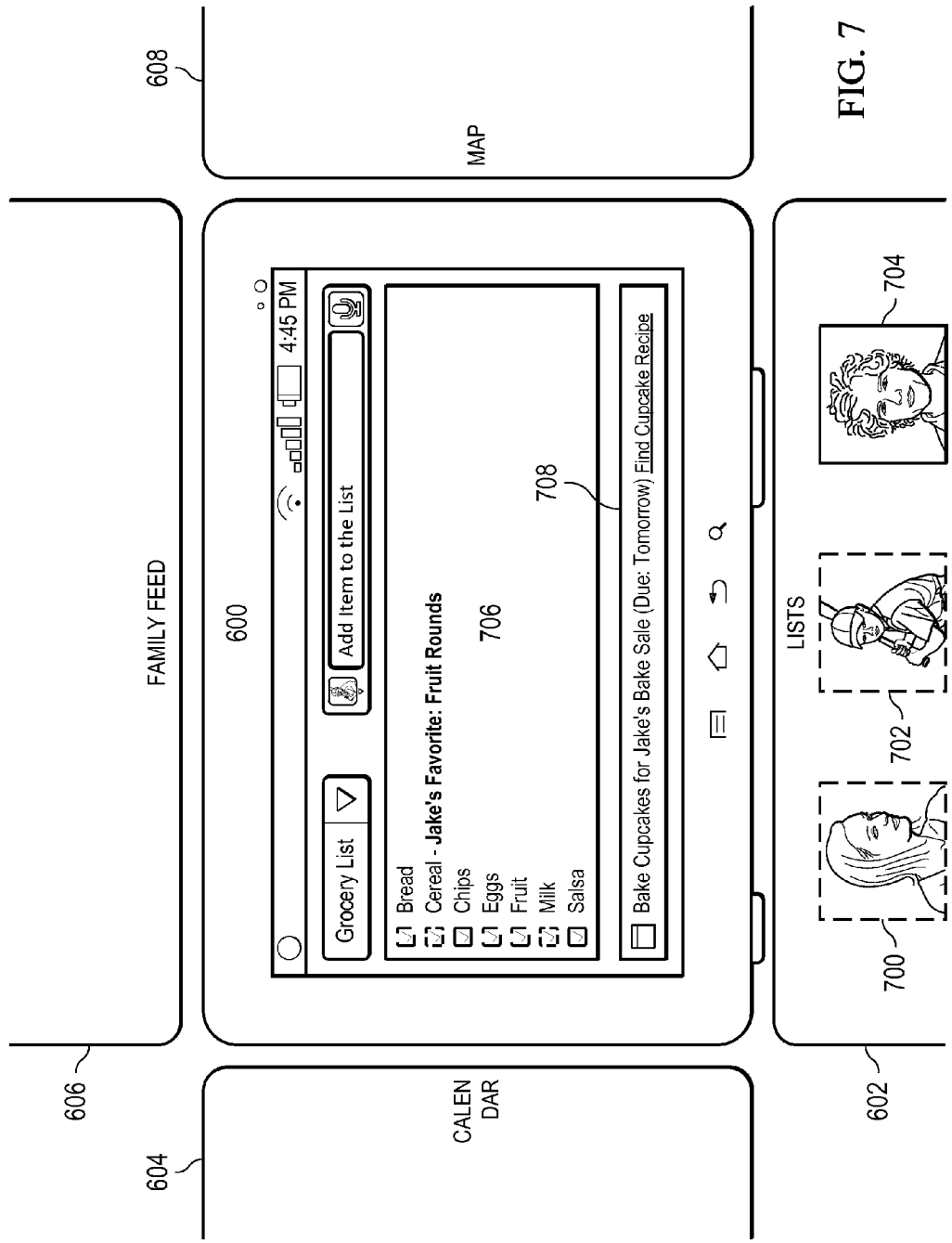
FIG. 7 is a graphical illustration of a collaboration device displaying collaborated user data according to one aspect of the present disclosure.

Referring particularly to FIG. 7, devices of three users 700, 702, and 704 are placed near a lower edge of the collaboration device 600, which detects their proximity and orientation at the lower edge by various proximity detection techniques. In response, the collaboration device 600 selects and executes a collaborative list application. The devices of users 700, 702, and 704 also detect positioning at collaboration zone 602. Upon detection, the devices of users 700, 702, and 704 transmit list data to the anchor device, collaboration device 600, which aggregates the list data of users 700, 702, and 704 in a common display, such as grocery list display 706, to do list display 708, or the like. Users 700, 702, and 704 may be permitted to view and edit list items by interacting with the device 600.

Figure 8:
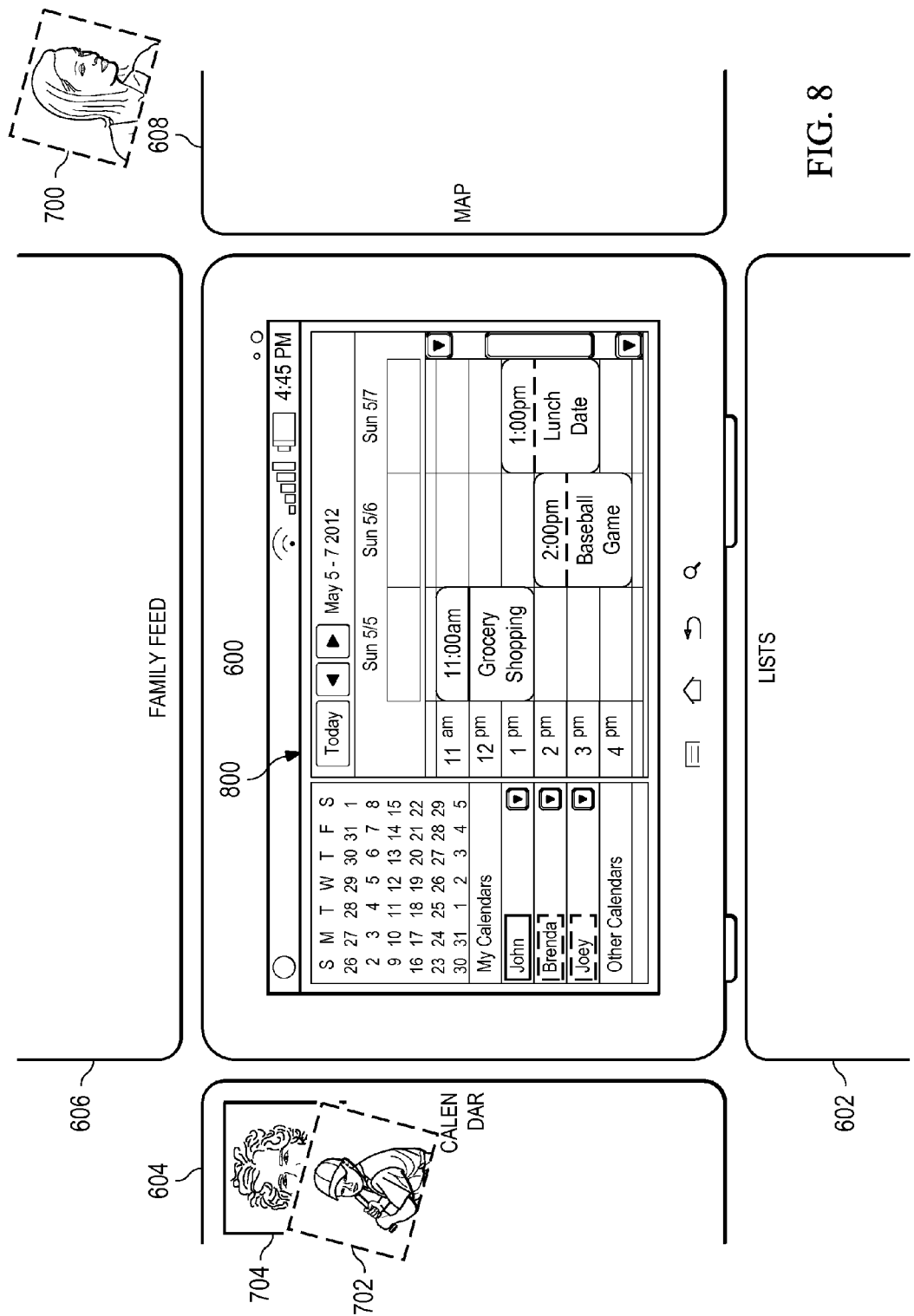
FIG. 8 is a graphical illustration of a collaboration device displaying collaborated user data according to another aspect of the present disclosure.

Referring next to FIG. 8, the device of user 700 is removed from the lists collaboration zone 602, and the devices of users 702 and 704 are moved to collaboration zone 604 near the left edge of the collaboration device 600. In response, the collaboration device 600 deletes any lists collaboration data received from the rich device of user 700. The collaboration device 600 then selects and executes the collaborative calendar application. The devices of users 702 and 704 also detect their location in the collaboration zone 604 and select the schedule data for transmission to the collaboration device 600, which aggregates the scheduled activities of users 702 and 704 in a combined schedule 800 graphically displayed as a calendar on collaboration device 600. Users 702 and 704 are permitted to view and edit scheduled items collaboratively via the collaboration display and/or their respective rich devices.

Figure 9:
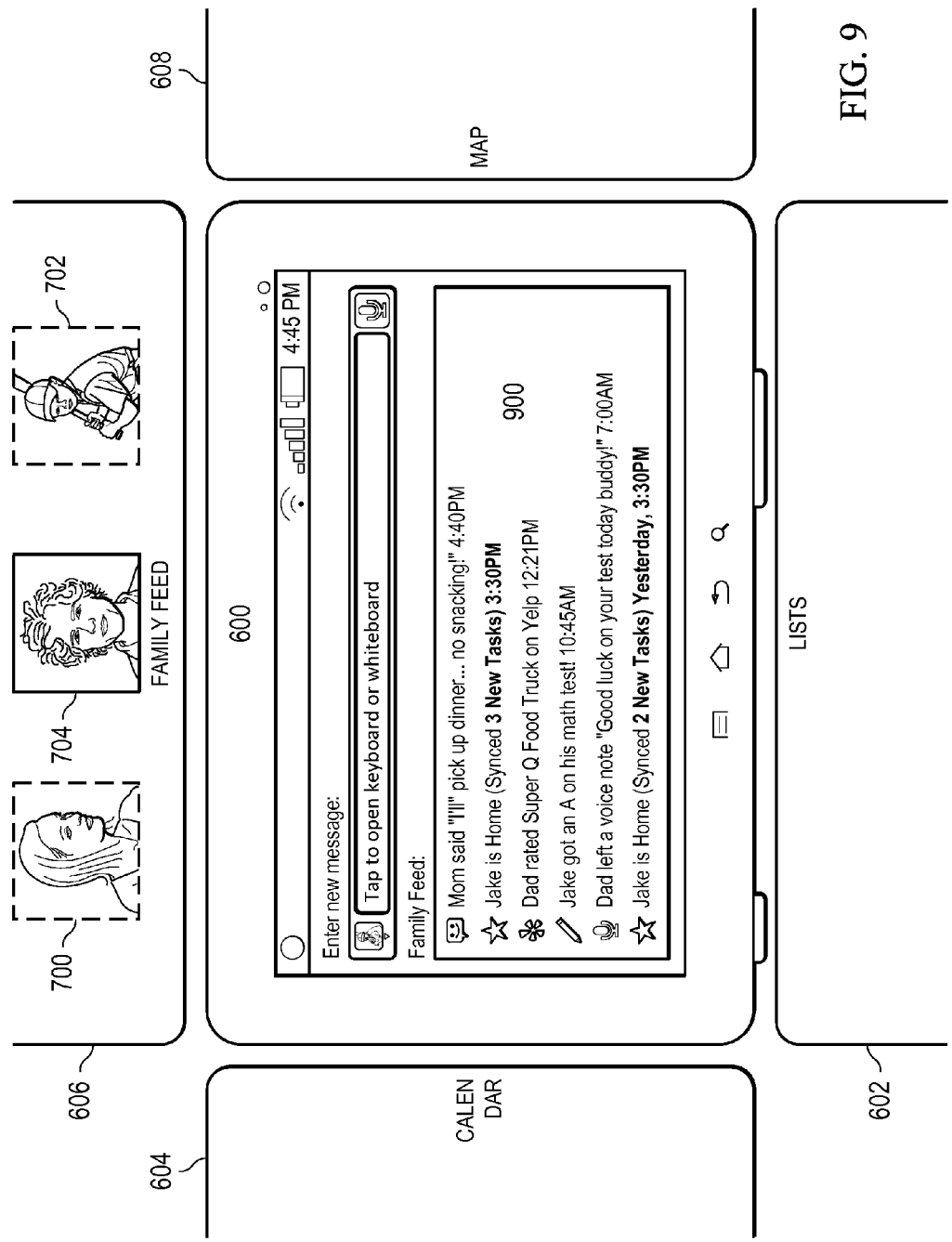
FIG. 9 is a graphical illustration of a collaboration device displaying collaborated user data according to an additional aspect of the present disclosure.

Referring next to FIG. 9, the devices of users 700, 702, and 704 are moved to collaboration zone 606 near the top edge of the collaboration device 600. In response, the collaboration device 600 deletes all of the calendar data received from the devices of users 700, 702, and 704. The collaboration device 600 selects and executes a collaborative social media application, in response to detecting the devices within collaboration zone 606. The devices of users 700, 702, and 704 also detect their location in collaboration zone 606, which causes the devices to transmit social media data to collaboration device 600, which aggregates message posts and social media updates of users 700, 702, and 704 in a common timeline display 900. Users 702 and 704 are permitted to view and edit posts and updates collaboratively via the collaboration display and/or their respective rich devices.

Figure 10:
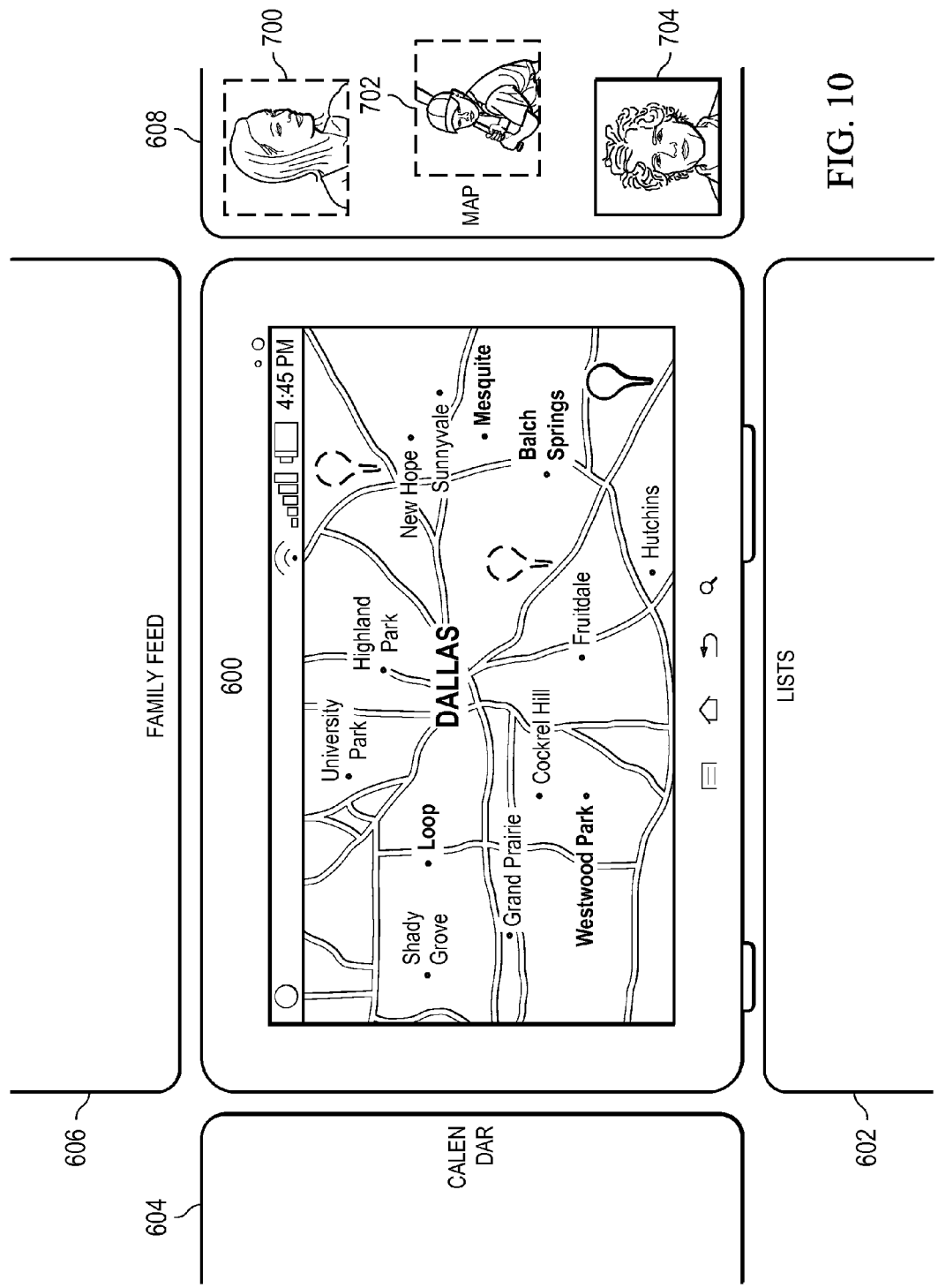
FIG. 10 is a graphical illustration of a collaboration device displaying collaborated user data according to a further aspect of the present disclosure.

Referring to FIG. 10, the devices of users 700, 702, and 704 are moved to collaboration zone 608 near the right edge of the collaboration device 600. In response, the collaboration device 600 deletes all of the social media data received from the devices of users 700, 702, and 704. The collaboration device 600 selects and executes a collaborative mapping/location application, in response to detecting the devices within collaboration zone 608. The devices of users 700, 702, and 704 also detect their location in collaboration zone 608, which causes the devices to transmit location data to collaboration device 600, which aggregates the location of users 700, 702, and 704 in a common map display 1000. The devices of users 700, 702, and 704 may be secondary display devices that are linked to remote devices in the possession of users 700, 702, and 704. Thus, the user of collaboration device 600 is then able to view the location information of users 700, 702, and 704, even though those users are not present.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The functional blocks and modules in FIGS. 1 and 2 may comprise processors, electronics devices, hardware devices, electronics components, logical circuits, memories, software codes, firmware codes, etc., or any combination thereof. Wireless radios 102 and/or 206, network interfaces 103 and/or 207, and/or sensor component 109 and/or 209 under control of processors 100 and/or 201 provide means for detecting proximity and orientation information for one or more mobile devices.

Wireless radios 102 and/or 206 and/or network interfaces 103 and/or 207 under control of processors 100 and/or 201 provide means for establishing a communication link with the one or more mobile devices, when the proximity and orientation information corresponds to a first shared collaboration state.

Memory 101 and/or 202 coupled to to processors 100 and/or 201 provide means for selecting an application to execute in response to the detected proximity and orientation information. Wireless radios 102 and/or 206 and/or network interfaces 103 and/or 207 under control of processors 100 and/or 201 provide means for receiving remote user data associated with the application from each of the one or more mobile devices over the communication link.

Interfaces 108 and/or 205 and memory 101 and/or 202 coupled to processors 100 and/or 201 provide means for populating a display interface with visual data associated with the application using local user data and the received remote user data.

Memory 101 and/or 202 coupled to processors 100 and/or 201 can provide the means for deleting the received remote user data when the proximity and orientation information changes from the first shared collaborative state.

Memory 101 and/or 202 coupled to processors 100 and/or 201 provide means for selecting a second application to execute in response to the detected proximity and orientation information corresponding to a second shared collaboration state.

Wireless radios 102 and/or 206 and/or network interfaces 103 and/or 207 under control of processors 100 and/or 201 provide means for receiving additional remote user data associated with the second application from each of the one or more mobile devices over the communication link.

Interfaces 108 and/or 205 and memory 101 and/or 202 coupled to processors 100 and/or 201 provide means for populating the display interface with visual data associated with the second application using the local user data and the additional remote user data.

Memory 101 and/or 202 coupled to processors 100 and/or 201 provide means for deleting the additional remote user data when the proximity and orientation information changes from the second shared collaborative state.

Wireless radios 102 and/or 206 and/or network interfaces 103 and/or 207 under control of processors 100 and/or 201 provide means for disconnecting the communication link when the proximity and orientation information corresponds to a non-shared state.

Interfaces 108 and/or 205 and memory 101 and/or 202 coupled to processors 100 and/or 201 provide means for receiving one or more interface inputs from one or more of a local mobile device and the one or more mobile devices.

Interfaces 108 and/or 205 and memory 101 and/or 202 coupled to processors 100 and/or 201 provide means for manipulating one or more of the local user data and the remote user data on the populated interface in response to the one or more interface inputs.

Wireless radios 102 and/or 206 and/or network interfaces 103 and/or 207 under control of processors 100 and/or 201 provide means for employing an anchor device on which the display interface is located, wherein the proximity and orientation information for the one or more mobile devices is relative to the proximity and orientation of the mobile devices in relation to each other and to the proximity and orientation of the mobile devices in relation to the anchor device.

Those of skill would further appreciate that the various illustrative logical blocks, modules, circuits, and algorithm blocks described in connection with the disclosure herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for collaborating user data, comprising:
   detecting, by a first mobile device, proximity and orientation information for one or more mobile devices;
   establishing, by the first mobile device, a communication link with the one or more mobile devices, when the proximity and orientation information corresponds to a first shared collaboration state;
   selecting an application to execute in response to the detected proximity and orientation information;
   receiving remote user data associated with the application from each of the one or more mobile devices over the communication link; and
   populating a display interface with visual data associated with the application using local user data and the received remote user data.

2. The method of claim 1, further comprising:
   deleting the received remote user data when the proximity and orientation information changes from the first shared collaborative state.

3. The method of claim 1, further comprising:
   selecting a second application to execute in response to the detected proximity and orientation information corresponding to a second shared collaboration state;
   receiving additional remote user data associated with the second application from each of the one or more mobile devices over the communication link;
   populating the display interface with visual data associated with the second application using the local user data and the additional remote user data; and
   deleting the additional remote user data when the proximity and orientation information changes from the second shared collaborative state.

4. The method of claim 1, further comprising:
   disconnecting the communication link when said proximity and orientation information corresponds to a non-shared state.

5. The method of claim 1, further comprising:
   receiving one or more interface inputs from one or more of: a local mobile device, in communication with the first mobile device, and the one or more mobile devices; and
   manipulating one or more of: local user data received from the local mobile device and the remote user data on the populated interface in response to the one or more interface inputs.

6. The method of claim 1, further comprising:
employing an anchor device on which the display interface is located, wherein the proximity and orientation information for the one or more mobile devices is relative to the proximity and orientation of the one or more mobile devices in relation to each other and to the proximity and orientation of the one or more mobile devices in relation to the anchor device.

7. An electronic apparatus comprising:
means for detecting, by a first mobile device, proximity and orientation information for one or more mobile devices;
means for establishing, by the first mobile device, a communication link with the one or more mobile devices, when the proximity and orientation information corresponds to a first shared collaboration state;
means for selecting an application to execute in response to the detected proximity and orientation information;
means for receiving remote user data associated with the application from each of the one or more mobile devices over the communication link; and
means for populating a display interface with visual data associated with the application using local user data and the received remote user data.

8. The electronic apparatus of claim 7, further comprising:
means for deleting the received remote user data when the proximity and orientation information changes from the first shared collaborative state.

9. The electronic apparatus of claim 7, further comprising:
means for selecting a second application to execute in response to the detected proximity and orientation information corresponding to a second shared collaboration state;
means for receiving additional remote user data associated with the second application from each of the one or more mobile devices over the communication link;
means for populating the display interface with visual data associated with the second application using the local user data and the additional remote user data; and
means for deleting the additional remote user data when the proximity and orientation information changes from the second shared collaborative state.

10. The electronic apparatus of claim 7, further comprising:
means for disconnecting the communication link when said proximity and orientation information corresponds to a non-shared state.

11. The electronic apparatus of claim 7, further comprising:
means for receiving one or more interface inputs from one or more of: a local mobile device, in communication with the first mobile device, and the one or more mobile devices; and
means for manipulating one or more of: local user data received from the local mobile device and the remote user data on the populated interface in response to the one or more interface inputs.

12. The electronic apparatus of claim 7, further comprising:
means for employing an anchor device on which the display interface is located, wherein the proximity and orientation information for the one or more mobile devices is relative to the proximity and orientation of the one or more mobile devices in relation to each other and to the proximity and orientation of the one or more mobile devices in relation to the anchor device.

13. A computer program product comprising:
a non-transitory computer-readable medium having program code recorded thereon for mirrored interface navigation on a plurality of mobile devices, the program code comprising:
program code to detect, by a first mobile device, proximity and orientation information for one or more mobile devices;
program code to establish, by the first mobile device, a communication link with the one or more mobile devices, when the proximity and orientation information corresponds to a first shared collaboration state;
program code to select an application to execute in response to the detected proximity and orientation information;
program code to receive remote user data associated with the application from each of the one or more mobile devices over the communication link; and
program code to populate a display interface with visual data associated with the application using local user data and the received remote user data.

14. The computer program product of claim 13, further having recorded thereon:
program code to delete the received remote user data when the proximity and orientation information changes from the first shared collaborative state.

15. The computer program product of claim 13, further having recorded thereon:
program code to select a second application to execute in response to the detected proximity and orientation information corresponding to a second shared collaboration state;
program code to receive additional remote user data associated with the second application from each of the one or more mobile devices over the communication link;
program code to populate the display interface with visual data associated with the second application using the local user data and the additional remote user data; and
program code to delete the additional remote user data when the proximity and orientation information changes from the second shared collaborative state.

16. The computer program product of claim 13, further having recorded thereon:
program code to disconnect the communication link when said proximity and orientation information corresponds to a non-shared state.

17. The computer program product of claim 13, further having recorded thereon:
program code to receive one or more interface inputs from one or more of: a local mobile device, in communication with the first mobile device, and the one or more mobile devices; and
program code to manipulate one or more of: local user data received from the local mobile device and the remote user data on the populated interface in response to the one or more interface inputs.

18. The computer program product of claim 13, further having recorded thereon:
program code to employ an anchor device on which the display interface is located, wherein the proximity and orientation information for the one or more mobile devices is relative to the proximity and orientation of the one or more mobile devices in relation to each other and to the proximity and orientation of the one or more mobile devices in relation to the anchor device.

19. A user device comprising:
   at least one processor;
   a memory coupled to the at least one processor; and
   a display device coupled to the at least one processor;
   wherein the at least one processor is configured:
   to detect, by a first mobile device, proximity and orientation information for one or more mobile devices;
   to establish, by the first mobile device, a communication link with the one or more mobile devices, when the proximity and orientation information corresponds to a first shared collaboration state;
   to select an application to execute in response to the detected proximity and orientation information;
   to receive remote user data associated with the application from each of the one or more mobile devices over the communication link; and
   to populate a display interface with visual data associated with the application using local user data and the received remote user data.

20. The user device of claim 19, wherein the at least one processor is further configured:
   to delete the received remote user data when the proximity and orientation information changes from the first shared collaborative state.

21. The user device of claim 19, wherein the at least one processor is further configured:
   to select a second application to execute in response to the detected proximity and orientation information corresponding to a second shared collaboration state;
   to receive additional remote user data associated with the second application from each of the one or more mobile devices over the communication link;
   to populate the display interface with visual data associated with the second application using the local user data and the additional remote user data; and
   to delete the additional remote user data when the proximity and orientation information changes from the second shared collaborative state.

22. The user device of claim 19, wherein the at least one processor is further configured:
   to disconnect the communication link when said proximity and orientation information corresponds to a non-shared state.

23. The user device of claim 19, wherein the at least one processor is further configured:
   to receive one or more interface inputs from one or more of: a local mobile device, in communication with the first mobile device, and the one or more mobile devices; and
   to manipulate one or more of: local user data received from the local mobile device and the remote user data on the populated interface in response to the one or more interface inputs.

24. The user device of claim 19, wherein the at least one processor is further configured:
   to employ an anchor device on which the display interface is located, wherein the proximity and orientation information for the one or more mobile devices is relative to the proximity and orientation of the one or more mobile devices in relation to each other and to the proximity and orientation of the one or more mobile devices in relation to the anchor device.

* * * * *